United States Patent
Broskey

(10) Patent No.: US 11,503,821 B2
(45) Date of Patent: *Nov. 22, 2022

(54) ANIMAL TRAPPING DEVICE

(71) Applicant: Alex John Broskey, Fort Lauderdale, FL (US)

(72) Inventor: Alex John Broskey, Fort Lauderdale, FL (US)

(*) Notice: Subject to any disclaimer, the term of this patent is extended or adjusted under 35 U.S.C. 154(b) by 13 days.

This patent is subject to a terminal disclaimer.

(21) Appl. No.: 16/872,201

(22) Filed: May 11, 2020

(65) Prior Publication Data

US 2020/0267965 A1   Aug. 27, 2020

Related U.S. Application Data

(63) Continuation-in-part of application No. 16/116,861, filed on Aug. 29, 2018, now Pat. No. 10,645,918.

(60) Provisional application No. 62/656,257, filed on Apr. 11, 2018.

(51) Int. Cl.
    *A01M 23/08* (2006.01)
    *A01M 23/16* (2006.01)
    *A01M 23/18* (2006.01)

(52) U.S. Cl.
    CPC ............ *A01M 23/08* (2013.01); *A01M 23/16* (2013.01); *A01M 23/18* (2013.01); *A01M 2200/00* (2013.01)

(58) Field of Classification Search
    CPC ...... A01M 23/00; A01M 23/02; A01M 23/08; A01M 23/16; A01M 23/14; A01M 23/18; A01M 23/20; A01K 69/06; A01K 69/08; A01K 69/10

USPC .................. 43/60, 58, 61, 64–67, 100, 105
See application file for complete search history.

(56) References Cited

U.S. PATENT DOCUMENTS

| | | | | |
|---|---|---|---|---|
| 178,375 A | * | 6/1876 | McRoberts | A01K 69/06 43/100 |
| 198,255 A | * | 12/1877 | Thedens | 43/118 |
| 363,858 A | * | 5/1887 | Steward | A01M 21/00 43/65 |
| 418,233 A | * | 12/1889 | Sallade | 43/118 |
| 475,845 A | * | 5/1892 | Bolling | A01M 21/00 43/65 |

(Continued)

FOREIGN PATENT DOCUMENTS

| | | | | |
|---|---|---|---|---|
| CA | 2852790 A1 | * | 11/2015 | ............ A01M 23/08 |
| DE | 338760 C | * | 7/1921 | |

(Continued)

*Primary Examiner* — Darren W Ark
(74) *Attorney, Agent, or Firm* — Mark C. Johnson; Johnson Dalal

(57) ABSTRACT

An animal trapping device with a base length separating first and second ends of the base, a wire mesh cage assembly operably configured to surround the base and defining a base opening and a width, wherein the base is selectively, freely, and removably disposed within the base opening. The device also includes one or two opposing mesh entrances with a second free end elevated above an upper surface of the base and defining an exit aperture. The first and second wire mesh entrances, the wire mesh cage assembly, and the upper surface of the base defining an animal retention zone and the exit apertures of the first and second wire mesh entrances facing one another and at least partially aligned with one another.

16 Claims, 13 Drawing Sheets

(56) References Cited

U.S. PATENT DOCUMENTS

| | | | | |
|---|---|---|---|---|
| 524,331 A * | 8/1894 | Lewis | A01M 21/00 | 43/65 |
| 583,924 A * | 6/1897 | McCoy | A01M 23/18 | 43/61 |
| 590,032 A * | 9/1897 | Anderson | A01M 21/00 | 43/65 |
| 643,669 A | 2/1900 | Marty | | |
| 693,391 A * | 2/1902 | Holland | A01K 69/06 | 43/100 |
| 812,761 A * | 2/1906 | Meier | 43/121 | |
| 819,255 A | 5/1906 | Stringfellow | | |
| 914,571 A * | 3/1909 | Heath | A01M 1/103 | 43/121 |
| 1,079,576 A * | 11/1913 | Noyes | A01M 21/00 | 43/65 |
| 1,146,698 A * | 7/1915 | Franklin | A01M 23/08 | 43/66 |
| 1,208,677 A * | 12/1916 | Smith | A01M 21/00 | 43/65 |
| 1,384,942 A * | 7/1921 | Dixon | A01M 23/00 | 43/66 |
| 1,474,087 A * | 11/1923 | Prime | A01M 23/18 | 43/66 |
| 1,479,509 A * | 1/1924 | Meyer | A01M 23/18 | 43/66 |
| 1,486,390 A * | 3/1924 | Pedersen | A01K 69/06 | 43/105 |
| 1,607,443 A * | 11/1926 | Cormier | A01K 69/08 | 43/65 |
| 1,647,027 A * | 10/1927 | Wagner | A01K 69/06 | 43/100 |
| 1,702,329 A * | 2/1929 | Wirth | A01M 23/24 | 43/66 |
| 1,726,909 A * | 9/1929 | Loftsgaarden | A01M 23/00 | 43/66 |
| 1,728,645 A * | 9/1929 | Ward | A01K 69/08 | 43/100 |
| 1,788,047 A * | 1/1931 | Brunner | A01M 23/18 | 43/66 |
| 1,797,685 A * | 3/1931 | Hastings | A01M 23/00 | 43/61 |
| 1,815,541 A * | 7/1931 | Bohannon | A01M 23/00 | 43/61 |
| 1,816,269 A * | 7/1931 | Topp | A01M 23/00 | 43/66 |
| 1,866,228 A * | 7/1932 | Smith | A01M 23/20 | 43/61 |
| 1,978,995 A * | 10/1934 | Fuller | A01M 23/00 | 43/76 |
| 2,162,623 A * | 6/1939 | Livingston | A01M 23/08 | 43/65 |
| 2,398,188 A * | 4/1946 | Meehan | A01M 23/00 | 43/99 |
| 2,516,658 A * | 7/1950 | Stelly | A01K 69/08 | 43/100 |
| 2,539,024 A * | 1/1951 | Leiby | A01K 1/03 | 43/60 |
| 2,752,722 A * | 7/1956 | Gardner | A01M 23/20 | 43/61 |
| 2,769,274 A * | 11/1956 | Ougland | A01K 69/10 | 43/65 |
| 2,897,627 A * | 8/1959 | Neid | A01M 23/02 | 43/65 |
| 3,271,894 A | 9/1966 | Manno et al. | | |
| 3,393,468 A * | 7/1968 | Wood | A01M 23/08 | 43/66 |
| 3,681,869 A * | 8/1972 | Barker | A01M 23/08 | 43/66 |
| 3,795,073 A * | 3/1974 | Olsen | A01K 69/10 | 43/100 |
| 3,800,464 A * | 4/1974 | Parker | A01K 69/08 | 43/100 |
| 3,821,861 A * | 7/1974 | Jalbert | A01K 69/08 | 43/65 |
| 3,906,655 A * | 9/1975 | Lowenthal, Jr. | A01K 69/08 | 43/100 |
| 4,019,459 A | 4/1977 | Neff | | |
| 4,075,779 A * | 2/1978 | Olafson | A01K 69/08 | 43/100 |
| 4,103,448 A * | 8/1978 | Souza | A01M 23/08 | 43/58 |
| 4,151,673 A * | 5/1979 | Campbell | A01M 23/08 | 43/67 |
| 4,161,924 A * | 7/1979 | Welker | A01K 1/0035 | 119/482 |
| 4,184,283 A * | 1/1980 | Wyman | A01K 69/08 | 43/65 |
| 4,221,070 A * | 9/1980 | Swindell | A01K 69/08 | 43/100 |
| 4,473,967 A * | 10/1984 | Poirot | A01K 69/06 | 43/100 |
| 4,509,288 A * | 4/1985 | Shepherd | A01K 69/08 | 43/102 |
| 4,538,375 A * | 9/1985 | Kelley | A01M 23/08 | 43/60 |
| 4,611,424 A * | 9/1986 | Tarantino | A01K 69/08 | 43/100 |
| 4,612,723 A | 9/1986 | Reed | | |
| 4,711,050 A * | 12/1987 | Galgana | A01K 69/08 | 43/102 |
| 4,829,704 A * | 5/1989 | Richardson | A01M 23/08 | 43/66 |
| 4,905,405 A * | 3/1990 | Hendricks | A01K 69/08 | 43/100 |
| 5,168,653 A * | 12/1992 | Wyman | A01K 69/06 | 43/100 |
| 5,218,781 A * | 6/1993 | Miller | A01K 69/10 | 43/100 |
| 5,259,809 A * | 11/1993 | Rainey, Jr. | A01K 69/06 | 119/213 |
| 5,357,708 A * | 10/1994 | Peters | A01K 69/06 | 43/100 |
| 5,410,837 A * | 5/1995 | Kazzyk | A01M 23/08 | 43/66 |
| 5,979,105 A | 11/1999 | Marks | | |
| 6,035,575 A * | 3/2000 | Hilty | A01K 69/06 | 43/100 |
| 6,367,419 B1* | 4/2002 | Gosselin | A01K 15/02 | 119/57.8 |
| 6,397,514 B1* | 6/2002 | Toney | A01M 23/02 | 43/65 |
| 6,484,672 B1* | 11/2002 | Versaw | A01M 23/20 | 43/61 |
| 6,804,911 B1* | 10/2004 | Henke | A01K 69/06 | 43/100 |
| 7,051,472 B1* | 5/2006 | Kelly | A01M 1/06 | 43/60 |
| 7,059,270 B1 | 6/2006 | Loginov | | |
| 7,171,777 B2 | 2/2007 | Welin-Berger | | |
| 7,434,351 B2 | 10/2008 | Bette | | |
| 7,866,086 B2* | 1/2011 | Murchison | A01M 23/08 | 43/61 |
| 8,733,291 B2* | 5/2014 | Dunigan | A01K 31/00 | 119/713 |
| 9,107,400 B1* | 8/2015 | Alptekin | A01M 23/10 | |
| 9,565,849 B1* | 2/2017 | Cassens | A01M 23/08 | |
| 9,781,910 B1* | 10/2017 | Burrell | A01K 69/06 | |
| 10,499,621 B1* | 12/2019 | Gibson | A01K 69/10 | |
| 10,645,918 B2* | 5/2020 | Broskey | A01M 23/16 | |
| 10,973,221 B1* | 4/2021 | Caffrey | A01M 23/08 | |
| 11,033,017 B2* | 6/2021 | Higgins | A01M 23/08 | |
| 2004/0181995 A1* | 9/2004 | Cheramie | A01K 69/10 | 43/105 |
| 2005/0044776 A1* | 3/2005 | McAllister | A01M 1/2011 | 43/131 |
| 2005/0178047 A1* | 8/2005 | Aguillera | A01M 23/18 | 43/61 |
| 2005/0198892 A1 | 9/2005 | Lin | | |

(56) References Cited

U.S. PATENT DOCUMENTS

| | | | |
|---|---|---|---|
| 2007/0251138 A1* | 11/2007 | Ribeiro De Matos | .................... A01K 69/10 43/65 |
| 2009/0025274 A1 | 1/2009 | Lail | |
| 2010/0139151 A1 | 6/2010 | Swiklinski et al. | |
| 2013/0205646 A1 | 8/2013 | McPhee | |
| 2019/0313627 A1* | 10/2019 | Broskey | A01M 23/08 |
| 2020/0221683 A1* | 7/2020 | Belak | A01M 1/026 |
| 2020/0288696 A1* | 9/2020 | Cassens | A01M 23/08 |
| 2020/0344994 A1* | 11/2020 | Higgins | A01M 23/08 |
| 2020/0396977 A1* | 12/2020 | Jaffre | A01M 1/106 |
| 2021/0378229 A1* | 12/2021 | Kilgore | A01M 23/16 |

FOREIGN PATENT DOCUMENTS

| | | | | |
|---|---|---|---|---|
| DE | 802963 C | * | 2/1951 | |
| DE | 202014007793 U1 | * | 11/2014 | ............ A01M 23/30 |
| FR | 705450 A | * | 6/1931 | |
| FR | 802310 A | * | 9/1936 | |
| FR | 830784 A | * | 8/1938 | |
| FR | 1255259 A | * | 3/1961 | |
| JP | 2016220659 A | * | 12/2016 | |
| KR | 20080100664 A | * | 11/2008 | |
| KR | 20110085184 A | * | 7/2011 | |
| KR | 101453990 B1 | * | 10/2014 | |
| SU | 1674766 A1 | * | 9/1991 | |
| WO | WO-2018072990 A1 | * | 4/2018 | ............ A01M 23/02 |
| WO | WO-2020118382 A1 | * | 6/2020 | |

\* cited by examiner

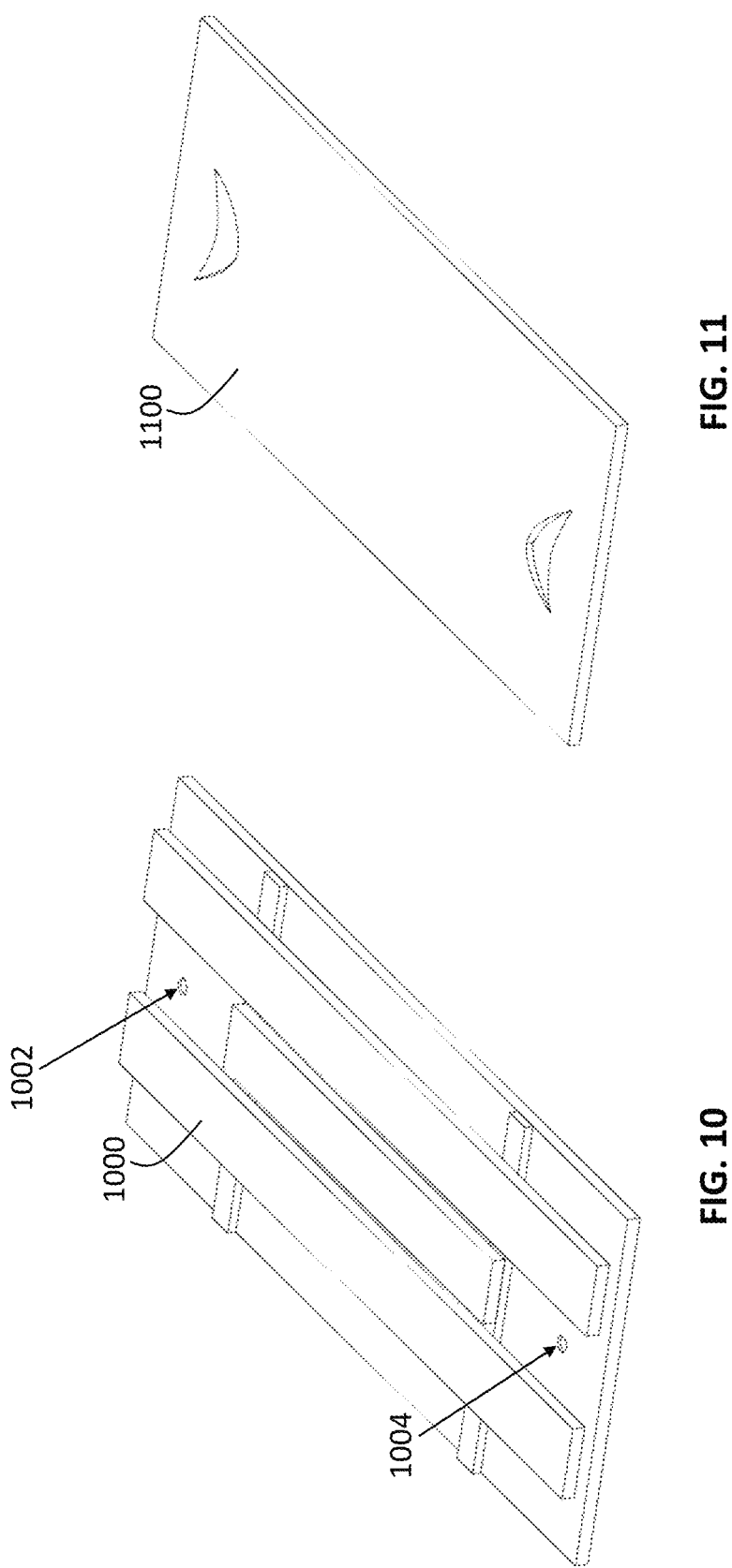

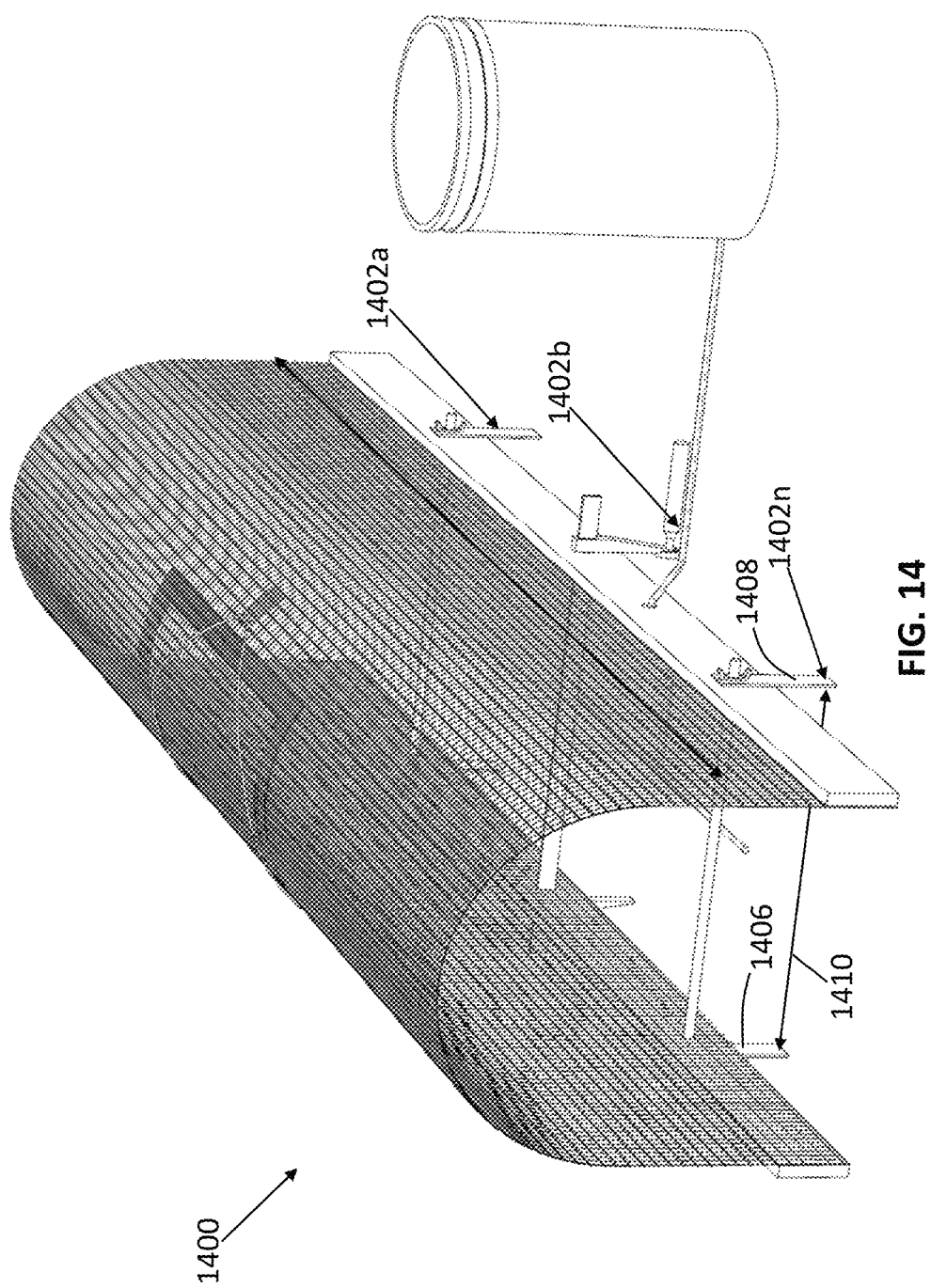

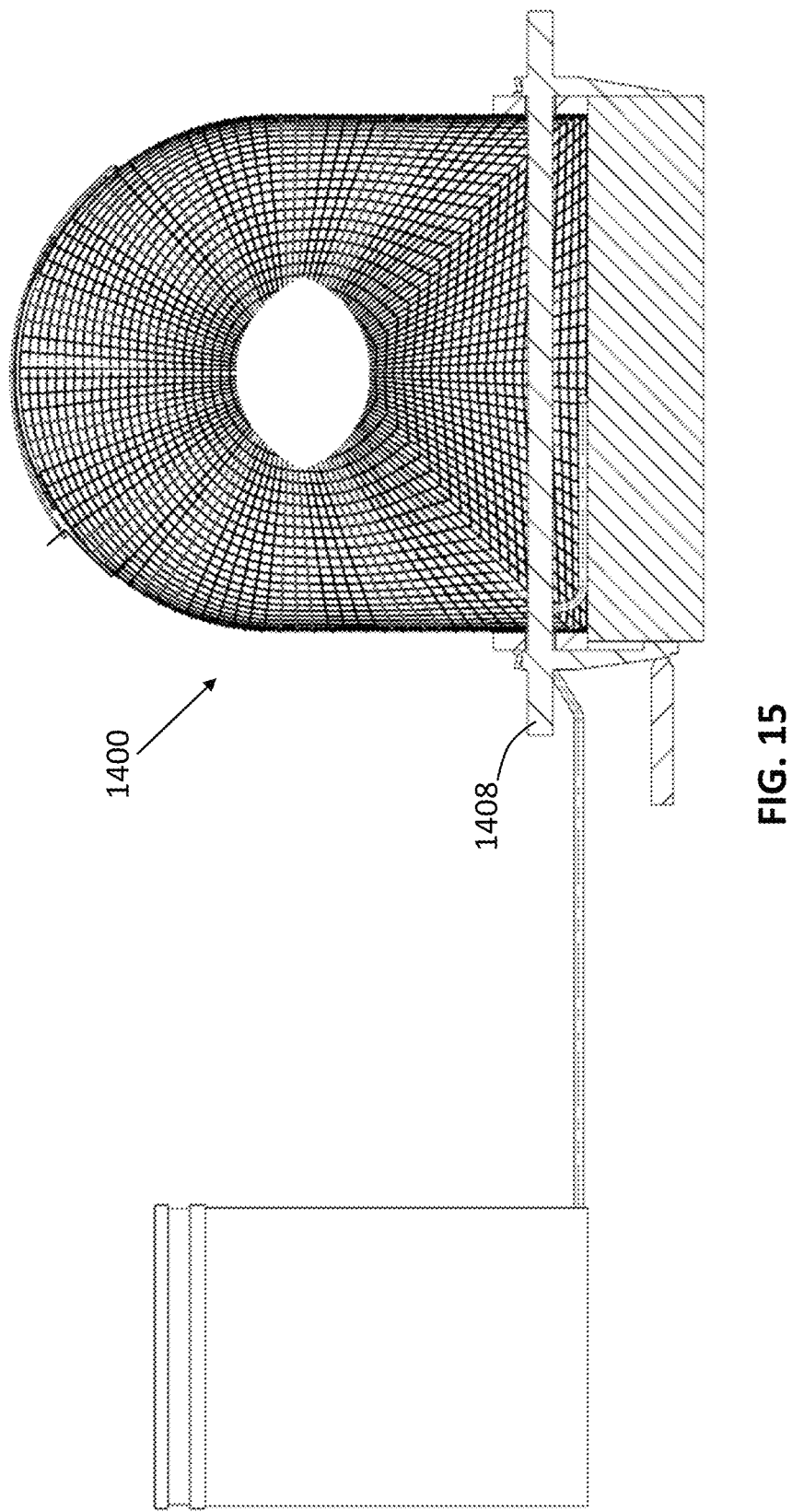

ANIMAL TRAPPING DEVICE

CROSS-REFERENCE TO RELATED APPLICATION

This application claims priority to U.S. Provisional Patent Application No. 62/656,257 filed Apr. 11, 2018, the entirety of which is incorporated by reference.

FIELD OF THE INVENTION

The present invention relates generally to animal trapping devices, and, more particularly, relates to devices design for trapping lizards, such as iguanas, and the like.

BACKGROUND OF THE INVENTION

Invasive animals are a species that is not native to a specific location and generally have a tendency to spread or proliferate to a degree that causes damage to an environment, human economy or even human health. As such, these animals adversely affect the habitats and bioregions they invade economically, environmentally, or ecologically. Even if not invasive, many other outside animals are known to cause physical and financial damage to habitants, their property, and the general ecology. More specifically, invasive animals such as iguanas often cause damage to residential and commercial landscape vegetation and are often considered a nuisance by many habitants and property owners. That is principally because iguanas are attracted to trees with foliage or flowers, most fruits (except citrus) and almost any vegetable. These animals also cause damage to infrastructure by digging burrows that erode and collapse sidewalks, foundations, seawalls, berms and canal banks. These iguanas also problematically leave droppings on docks, moored boats, seawalls, porches, decks, pool platforms and inside swimming pools. Like other reptiles, iguanas can also transmit the infectious bacterium *Salmonella* to humans through contact with water or surfaces contaminated by their feces. Therefore, many users desire a means to effectively and efficiently trap these animals, in particular lizards such iguanas.

Iguanas are large lizards that are invasive and not native to most, if not all, of the United States. Adult iguanas range in color and include the innate ability to regulate their body temperature. Most lizards, such as iguanas, can live on the ground, in shrubs or in trees in a variety of habitats including suburban developments, urban areas, small towns and agricultural areas. Iguanas are also excellent swimmers and can tolerate both salt and freshwater. Lizards, such as iguanas, can grow to over 5 feet in length and weigh up to 17 pounds. Females typically reach reproductive maturity at two to four years of age. Iguanas typically mate in October through November in their native range, and nesting occurs on riverbanks, beaches and other sandy areas. They dig egg chambers that may contain nearly 80 feet of interconnected tunnels and multiple entrances and lay clutches of anywhere from 14-76 eggs, leading to the above-referenced and problematic proliferation. Most lizards can also live up to 10-15 years.

Some known traps include a tapered single entrance portion defining an entrance aperture that permits animals to enter the trap. Once an animal enters the trap, the device includes one or more enclosures or barriers designed to close once the animal reaches a certain point within the trap. These devices, however, are prone to failure and misapplication in practice. These devices are also comparatively more expensive in light of the additional moving components or parts. These devices are also ineffective for trapping lizards, such as iguanas, which are very hesitant to enter an enclosed structure or entrance. Lastly, these known devices also fail to provide an effective and efficient means for removal and/or disposal of the lizards.

Other known animal traps are also commercially impracticable and/or ineffective when the target animal is a lizard, such as an iguana. More specifically, the designs of these known traps do not provide an inviting entrance for a lizard's entry into the trap. Additionally, many of these known traps do not provide an internal environment within the trap that is thermally inviting for the lizards, i.e., cooler than the ambient environment, thereby substantially reducing the likelihood that the lizards desire to enter the trap.

Therefore, a need exists to overcome the problems with the prior art as discussed above.

SUMMARY OF THE INVENTION

The invention provides an animal trapping device and method of use that overcomes the hereinafore-mentioned disadvantages of the heretofore-known devices and methods of this general type and that effectively, efficiently, and safely lures and traps multiple lizards, such as iguanas.

With the foregoing and other objects in view, there is provided, in accordance with the invention, an animal trapping device with a base having a first end, a second end opposing the first end, two opposing sides, a lower surface, an upper surface opposing the lower surface of the base, and a base length separating the first and second ends of the base. The device also includes a wire mesh cage assembly having a first end with a perimeter edge, a second end with a perimeter edge and opposing the first end of the wire mesh cage assembly, a wire mesh length separating the first and second ends, and two opposing side edges spanning the wire mesh length, wherein the two opposing side edges define a base opening and a width, the base selectively, freely, and removably disposed within the base opening. The device also includes a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the first wire mesh entrance to the second free end of the first wire mesh entrance, and defines an enclosed entrance channel spanning from the enclosed entrance opening to the exit aperture of the first wire mesh entrance. The device also includes a second wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the second wire mesh entrance to the second free end of the second wire mesh entrance, and defines an enclosed entrance channel spanning from the enclosed entrance opening to the exit aperture of the second wire mesh entrance, the first and second wire mesh entrances. The wire mesh cage assembly, and the upper surface of the base defining an animal retention zone and the exit apertures of the first and second wire mesh entrances facing one another and at least partially aligned with one another without obstruction disposed between the exit apertures and within the animal retention zone.

Also in accordance with the present invention, an animal trapping device is disclosed a base having a first end, a second end opposing the first end, two opposing sides, a lower surface, an upper surface opposing the lower surface of the base, a base length separating the first and second ends of the base, and defining a reservoir operably configured to house and retain a liquid thereon. The device also includes a wire mesh cage assembly having a first end with a perimeter edge, a second end with a perimeter edge and opposing the first end of the wire mesh cage assembly, a wire mesh length separating the first and second ends, and two opposing side edges spanning the wire mesh length. The device also includes a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the first wire mesh entrance to the second free end of the first wire mesh entrance, and defining an enclosed entrance channel spanning from the enclosed entrance opening to the exit aperture of the first wire mesh entrance. The device also includes a second wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the second wire mesh entrance to the second free end of the second wire mesh entrance, and defines an enclosed entrance channel spanning from the enclosed entrance opening to the exit aperture of the second wire mesh entrance. The first and second wire mesh entrances, the wire mesh cage assembly, and the upper surface of the base defining an animal retention zone and the exit apertures of the first and second wire mesh entrances facing one another and at least partially aligned with one another without obstruction disposed between the exit apertures and within the animal retention zone, and the reservoir interposed between at least one of the first and second wire mesh entrances. A liquid feeding assembly is also utilized that includes a container housing a liquid therein and with a liquid feed conduit having an end opening disposed proximal to the reservoir and in liquid communication with the container housing the liquid, wherein the liquid feeding assembly operably configured to supply liquid from the container to the reservoir.

Although the invention is illustrated and described herein as embodied in an animal trapping device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the trap spanning from a first entrance to a second entrance.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 8-13 are perspective views of a base configured for selective placement within a base opening defined by the animal trapping device depicted in FIG. 7;

FIG. 14 is a perspective fragmentary view of an animal trapping device in accordance with another embodiment of the present invention;

FIG. 15 is an elevational side view of the animal trapping device depicted in FIG. 14.

DETAILED DESCRIPTION

Figure 1:
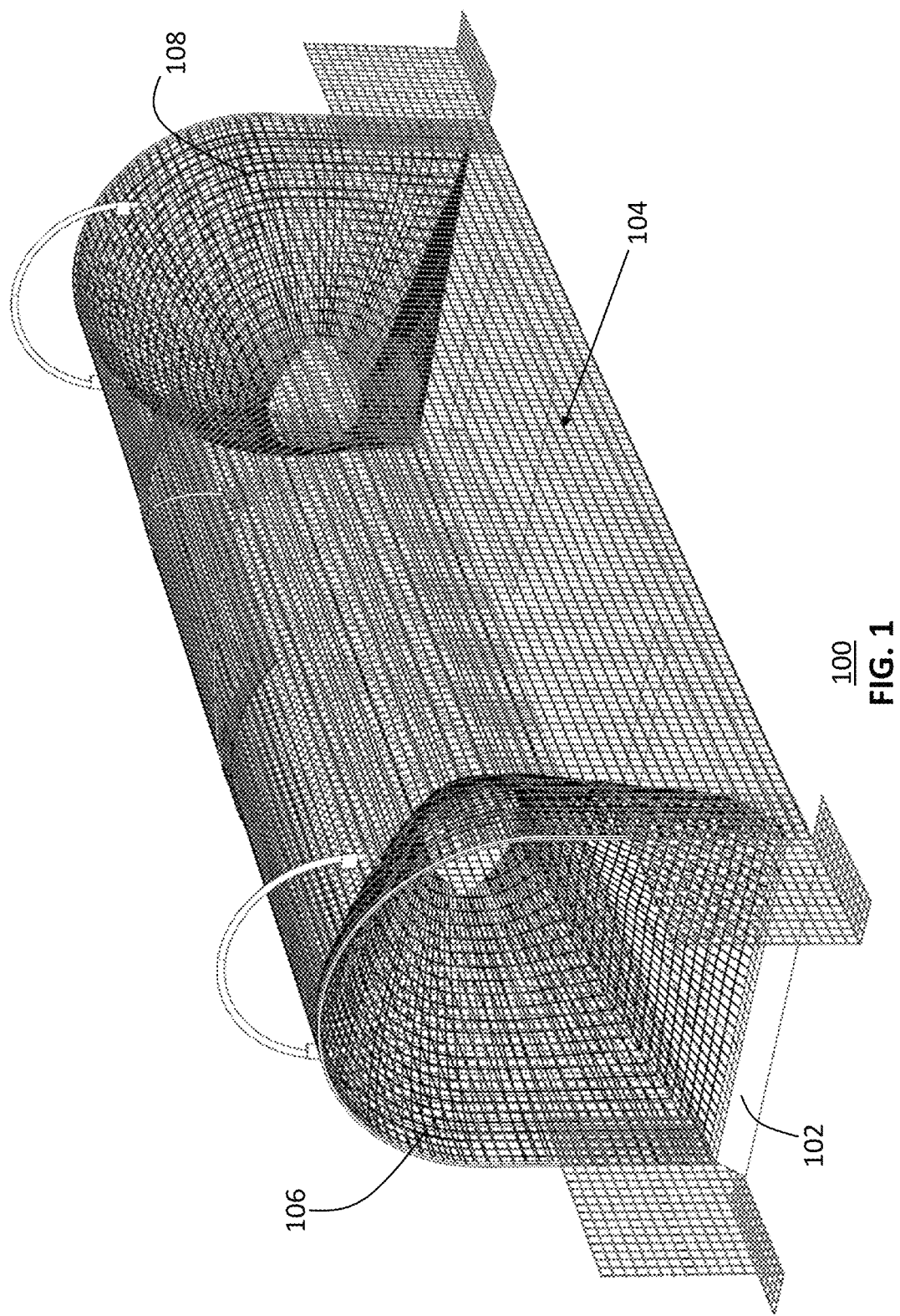
FIG. 1 is a downward-looking perspective view of an animal trapping device in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient animal trapping device. More specifically, embodiments of the invention provide a trapping device that effectively and efficiently leads lizards, such as iguanas, through uniquely configured entrances into an animal retention zone defined therein where they are trapped and prevented or substantially inhibited from leaving. Embodiments of the device also enables users to quickly easy capture and safe dispatch of invasive animals, e.g., lizards, iguanas, snakes, rats and similar animals, particularly those that travel on sea walls, canals, drainage ditches, bulkheads, trails and in shelter areas.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of an animal trapping device 100, as shown in FIG. 1, includes a base 102, a wire mesh cage assembly 104, and first and second entrances 106, 108. While FIG. 1 depicts two entrances 106, 108, some embodiments of the present invention include the device 100 having a single entrance.

With reference now to FIGS. 1-3 and 5, the base 102 may have a substantially planar lower surface 300 and an upper surface 500 opposing the lower surface 300 of the base 102. The lower surface 300 is beneficially substantially planar to effectuate placement and stability of the device 100, particularly at substantially planar seawalls, e.g., seawall 200. Said another way, the lower surface 300 may be substantially planer in that it can rest in a level position (+/−20°) on a ground surface, e.g., an upper surface 202 of a seawall/bulkhead 200. The base 102 also includes a first end 502, a second end 504 opposing the first end 502, and two opposing sides 506, 508. Beneficially, the substantially planar lower surface 300 may span from the first end 502 of the base 102 to the second end 504 of the base 102. In one embodiment, the base 102 is of a wood material that may be coated with waterproof coating to sustain outside environmental conditions. In other embodiments, the base 102 is of a rigid polymeric material (e.g., 60-80 Shore A), a metallic material (e.g., stainless steel), or other substantially rigid material.

The base 102 also beneficially includes one or more a reservoir(s) 510, 512 operably configured to house and retain a liquid thereon, e.g., water. In one embodiment, the outside perimeter 514 of the base 102 may include a rubber wall or other barrier that prevents or inhibits water or other liquid from escaping the upper surface 500 of the base 102 up to a predetermined height, e.g., 1-2 inches. In other embodiments, the base 102 includes one or more enclosed liquid basin(s) 516, 518 defining the one or more reservoir(s) 510, 512. The first and second liquid basins 516, 518 may be a depth of approximately 0.2-2 inches and may extend downwardly from the upper surface 500 of the base 102 to the upper surface 202 of the seawall 200, a thickness of the base 102, or until reaching a metallic floor that are designed to inhibit or prevent liquid, e.g., water from escaping through the bottom surface 300 of the base 102. In a preferred embodiment, the depth of the basin(s) 516, 518 are approximately ¾ inches. The basin(s) 516, 518 and/or reservoir(s) 510, 512 may be of an oblong shape or other shape that can carry out the above-described purpose.

Figure 2:
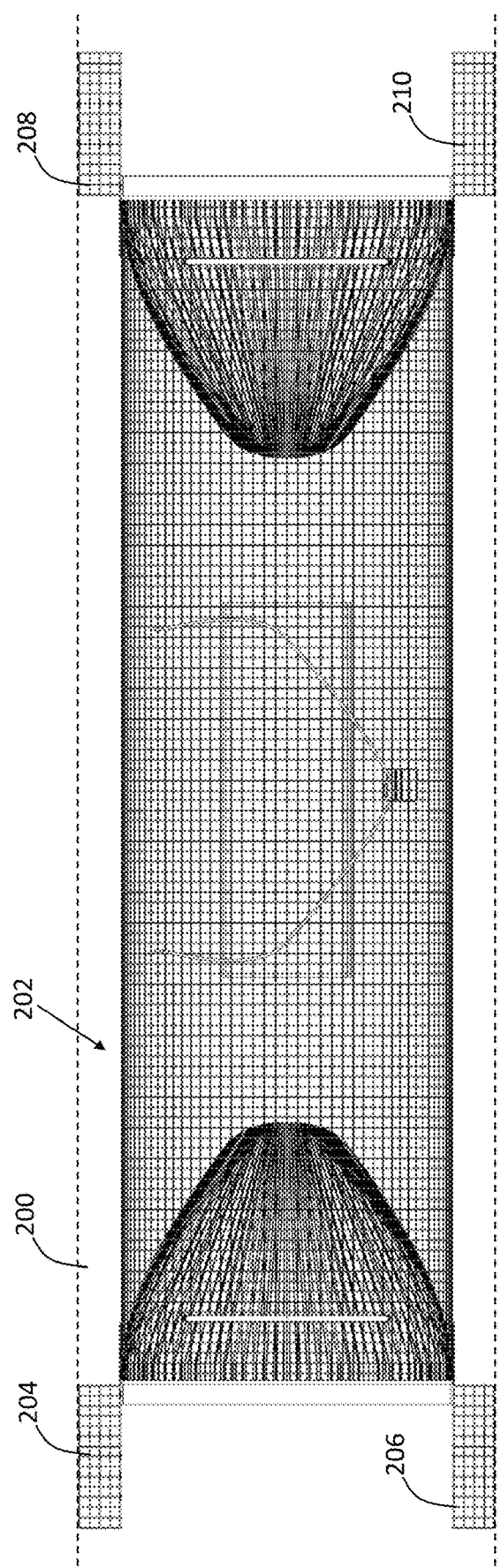
FIG. 2 is a top plan view of the animal trapping device of FIG. 1 coupled to a seawall in accordance with one embodiment of the present invention.
Figure 3:
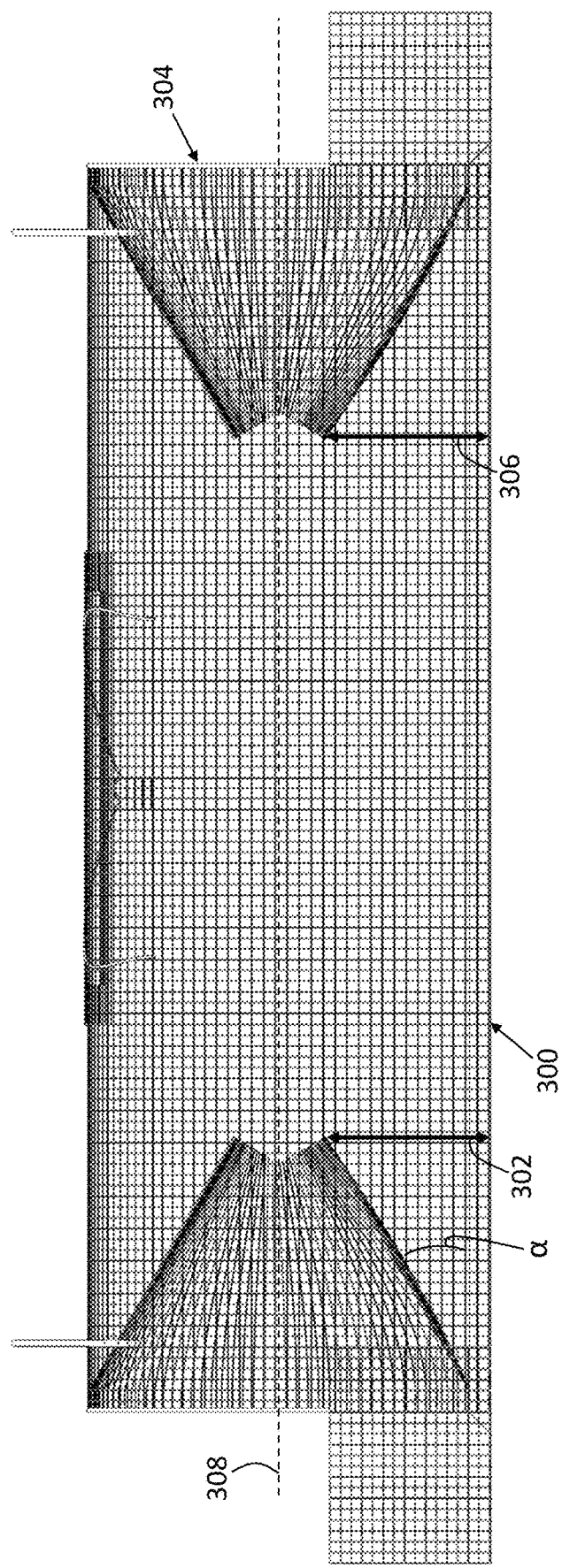
FIG. 3 is an elevational side view of the animal trapping device of FIG. 1.
Figure 4:
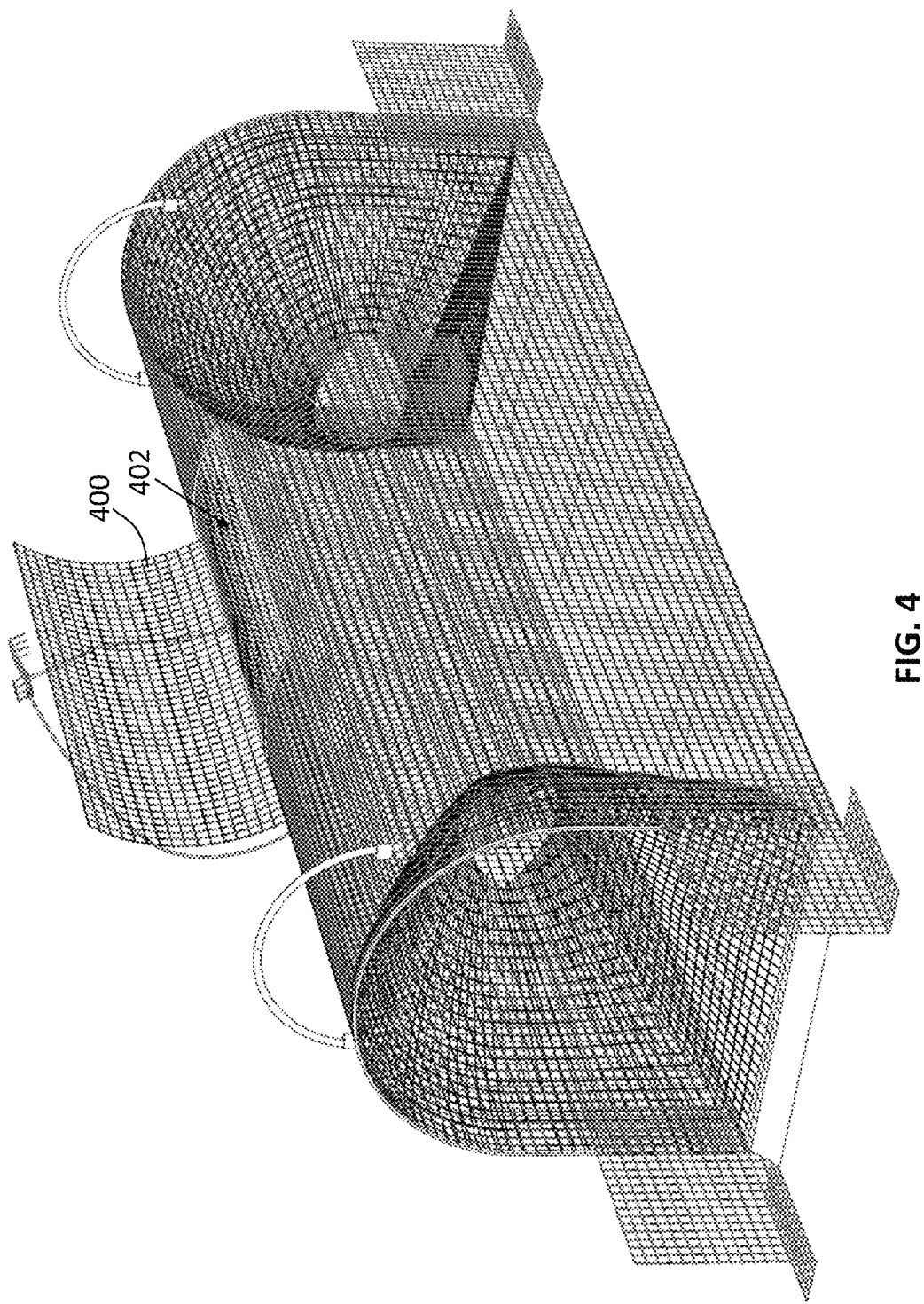
FIG. 4 is downward-looking perspective view of the animal trapping device of FIG. 1 with an upper gate opened thereon.
Figure 5:
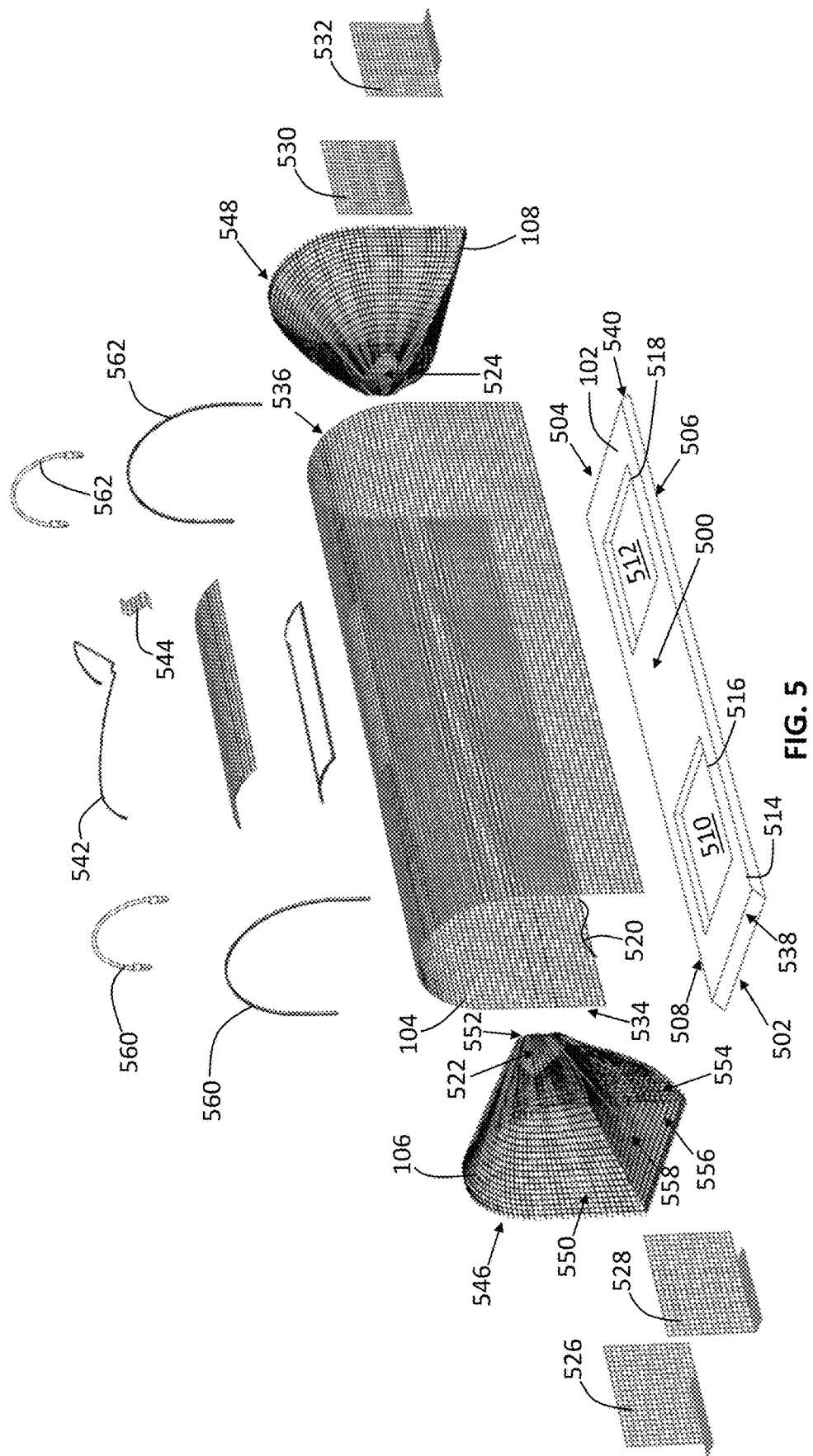
FIG. 5 is an exploded view of the animal trapping device of FIG. 1.
Figure 6:
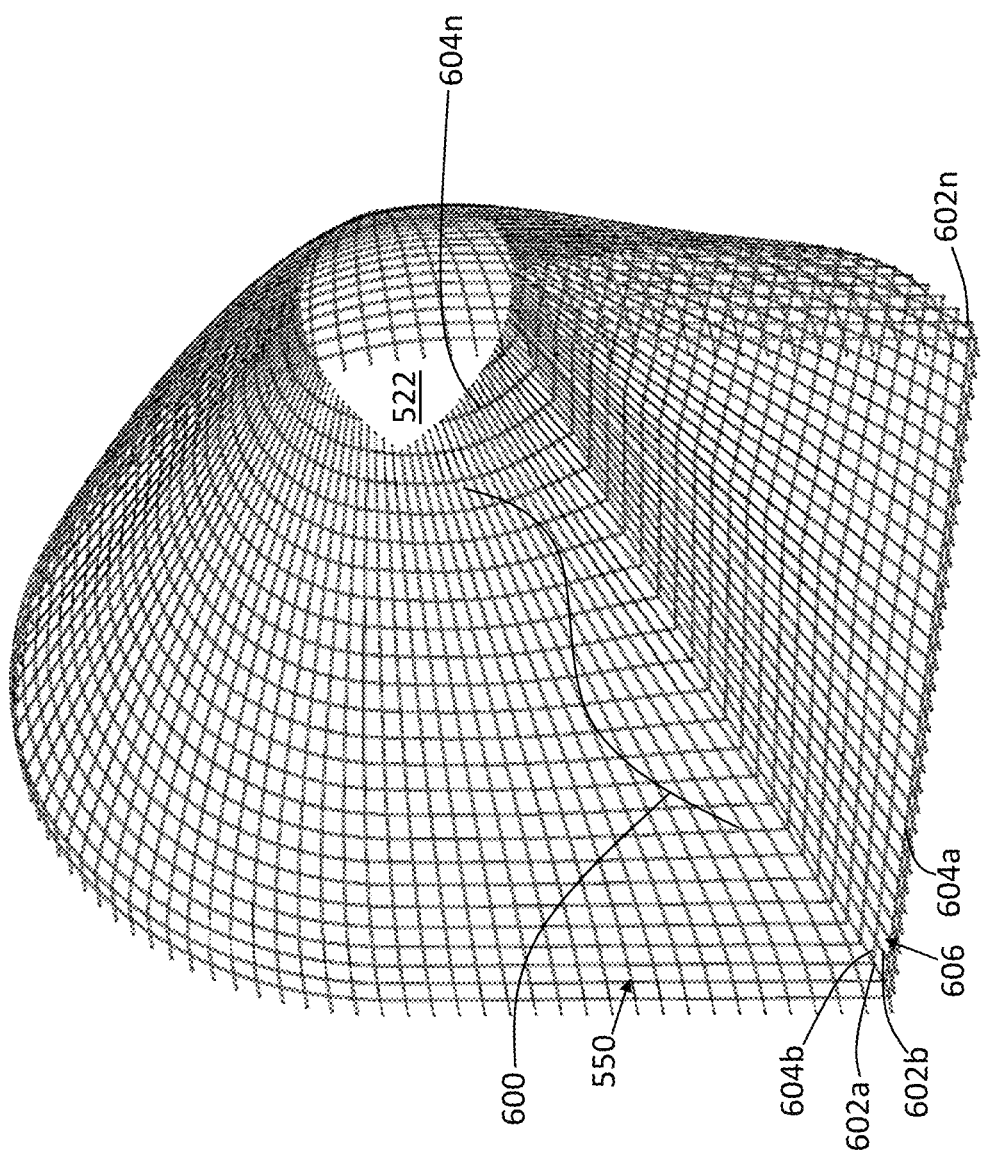
FIG. 6 is a perspective view of an entrance of the animal trapping device of FIG. 1.
Figure 7:
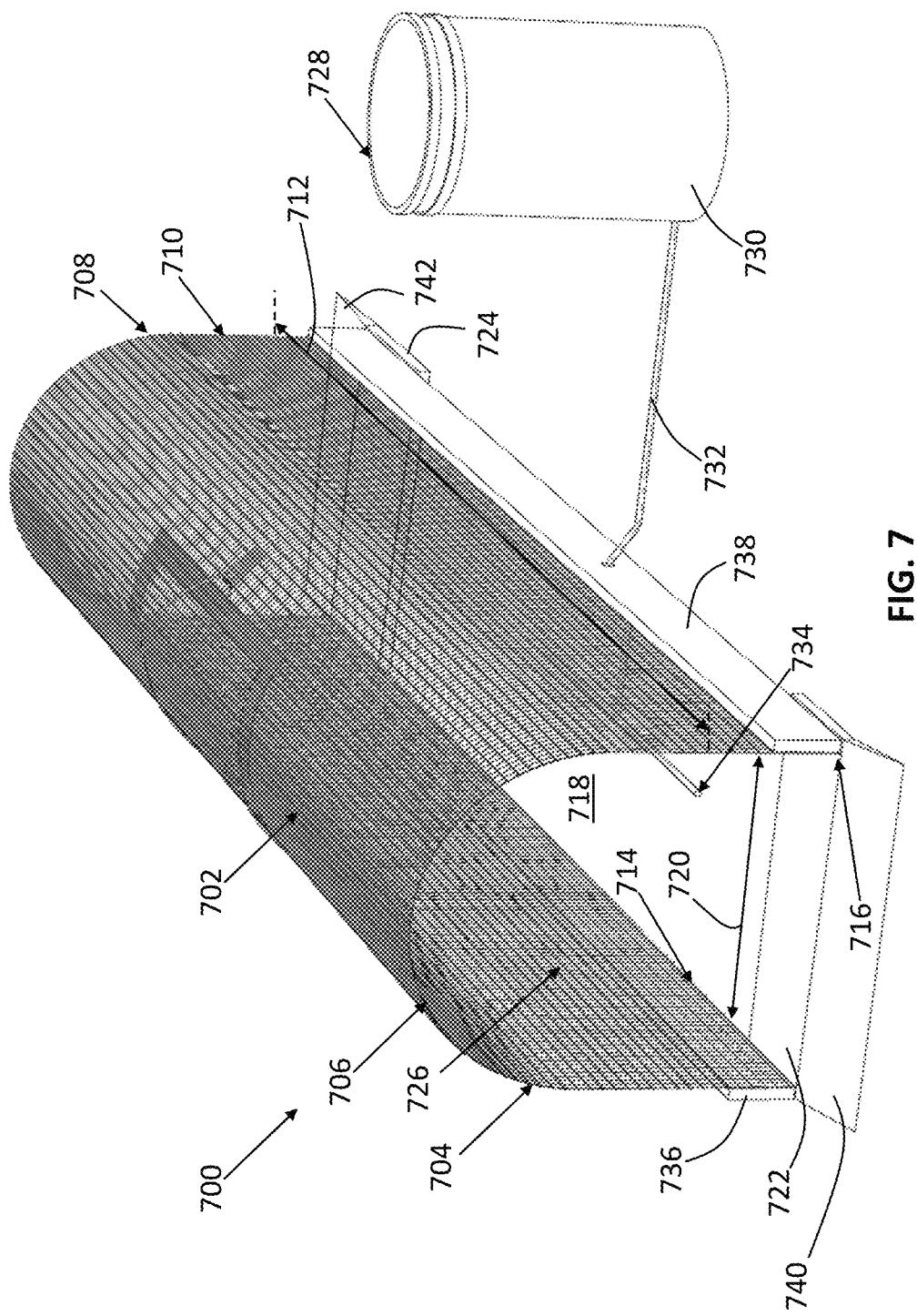
FIG. 7 is a perspective fragmentary view of an animal trapping device in accordance with another embodiment of the present invention.

More specifically, the reservoir(s) 510, 512 beneficially facilitate in creating one or more evaporative water cooling temperature environment(s) or zone(s) that are designed to attract animals, namely lizards such as iguanas, into an animal retention zone 520 defined by the upper surface 500 of the base 102, the wire mesh cage assembly 104, and the first and/or second wire mesh entrances 106, 108 when assembled together as depicted in FIGS. 1-3. For example, using an infrared thermometer, testing has indicated that in an ambient environment having a temperature of approximately 85° F. and relative humidity of approximately 65% that the environmental area disposed above and closely neighboring the reservoir(s) 510 with water disposed therein was approximately 91.7° F., while the upper surface 500 of the base 102 was approximately 95.9° F. and the upper surface 202 of the seawall 200 was approximately 100.4° F.

As such, when the reservoir(s) 510, 512 are placed or disposed beneath the one or more entrances 106, 108 (i.e., interposed between the entrance(s) 106, 108 and the base 102) and/or in front of the exits 522, 524 of the entrances 106, 108, respectively, lizards are attracted inwardly toward the animal retention zone 520 and upwardly up the entrances 106, 108. In one embodiment, the basin(s) 516, 518 and/or reservoir(s) 510, 512 is disposed directly below the exit apertures 522, 524. As such, a lizard entering the animal retention zone 520 immediately enters the basin(s) 516, 518 and/or reservoir(s) 510, 512, thereby preventing or significantly inhibiting the lizard from exiting the animal retention zone 520. In another embodiment, the base 102 includes a portion that is not recessed proximal to the exits 522, 524 of the entrances 106, 108. Said another way, the upper surface 500 of the base 102 is at or near the exits 522, 524 to allow an entering lizard to contact the upper surface 500 and not enter the one or more basin(s) 516, 518. In one embodiment, the assembly 100 may also include an automatic liquid feeder fluidly coupled to a water source that continuously delivers water or other liquid in predetermined or selectively adjustable amounts to the one or more reservoir(s) 510, 512 to keep the water level in the reservoir(s) 510, 512 at a desired height, e.g., ¼-1 inches. Said differently, the assembly 100 may include a gravity-based liquid distribution or feeding container disposed within or proximal to each water basin(s) 516, 518 and/or reservoir(s) 510, 512, wherein said gravity-based liquid distribution or feeding container will house a liquid therein (at a set level to fill the basin up to a predetermined level) and continually refill the basin with liquid when depleted due to evaporation and/or drinking from the animal(s) housed within the cage assembly 100.

In other embodiments, the water basin(s) 516, 518 and/or reservoir(s) 510, 512 may be disposed inside the perimeter 514 of the base 102 and in other areas within the animal retention zone 520 to cause evaporation of liquid, e.g., water, retained therein, thereby generating a low-heat/temperature environment that attracts a large percentage of existing resident or transient target animals into the inner trap area/animal retention zone 520. Said another way, the water housed within the reservoir(s) 510, 512 is used to cool the upper surface 500 of the base 102 to a more desirable wet bulb temperature in hotter weather, thereby attracting animals within the animal retention zone 520. Air spaces may also be provided by the base 102 for air to circulate around and under the base 102 of the trap assembly 100, thereby enhancing cooling and comfort for the animal trapped within the animal retention zone 520.

Once in the animal retention zone 520, the lizards are prevented from escaping in part because of the elevated exit apertures 522, 524 relative to the upper surface 500 of the base 102. Exposing water and food in the area below the entrances/funnels 106, 108 is also useful in aligning the target animal for entry into the animal retention zone 520. The water-cooling temperature environment(s) or zone(s) also provides drinking water for the animals trapped within the animal retention zone 520.

To facilitate in cooling or other temperature control, the base 102 of the trap assembly 100 may be of a surface-treated heavy plywood, painted with reflective colored paints (to reduce the surface temperature of the base), of a matte or flat non-glossy paint. The base 102 color is chosen with warming or cooling of the environment in mind, dark colors in lower ambient conditions enhances the attraction into the trap with little or no water needed. Reflective paints and water reservoirs are used in very high ambient sunny areas to reflect heat but allow sunlight to enter the animal retention zone 520. The color of the welded hardware cloth wire assembly 104 and/or entrances 106, 108 may also be similarly dependent on existing ambient conditions.

The thickness of the base 102 may be approximately 0.5-3 inches and may be of a material rigidity and/or deformity to act as a durable backstop for air-pellet projectiles and/or an animal puncturing device used to safely dispatch of the lizards or other animals captured within the animal retention zone 520. The density of the base 102 is preferably set to a weight that acts as a ballast to prevent unintended overturning of the assembly 100 in higher wind conditions and or overturning due to the mass movements of great numbers of the captured animals within the animal retention zone 520. In one embodiment, the weight of the assembly 100 is proximately 50-60 lbs. when the base 102 is of a plywood material. The weight of the assembly 100 may be approximately 15-25 lbs. when the base is of a pine material. If the assembly 100 is rolled into deep water, it is also operably configured to float and is easily recoverable because the geometry of the base 102 creates sufficient water displacement.

In one exemplary application of the assembly 100, the base 102 is sized in width from side-to-side 506, 508 to correspond with the width of the upper surface 202 of the seawall 200, e.g., 18-36 inches. When the width of the base 102 is not sized to fit the width of the upper surface 202 of the seawall 200 and/or to effectuate entry of the lizards into the entrance(s) 106, 108, the assembly 100 may utilize wings 526, 528, 530, 532 with corresponding sweeps 204, 206, 208, 210. For example, two opposing front wings, e.g., 526, 528, may be coupled to the first end 534 of the wire mesh cage assembly 104, flanking a first ramp 538 associated with and/or coupled to the base 102, and disposed at a substantially orthogonal orientation with respect to the upper surface 500 of the base 102. Similarly, two opposing rear wings 530, 532 may be coupled to a second end 536 of the wire mesh cage assembly 104, flanking a second ramp 540, and disposed at a substantially orthogonal orientation with respect to the upper surface 500 of the base 102. In one embodiment, the first ramp 538 is disposed at the first end 502 of the base 102 and a second ramp 540 disposed at the second end 504 of the base 102, wherein the first and second ramps 538, 540 each include a raised end disposed proximal (at or near) to the first ends 546, 548 of the first and second wire mesh entrances 106, 108, respectively. The first and second ramps 538, 540 may be disposed at an approximately 45° angle to prevent the lizard from stopping at a raised edge.

Said another way, the plane generally defined by the upper surface 500 of the base 100 is substantially perpendicular to the orientation of the wing(s) 526, 528, 530, 532. One or more of the wing(s) 526, 528, 530, 532 may be selectively movable or translatable to meet the width of the upper surface 202 of the seawall 200 and/or close up any gaps between the sides 506, 508 of the base 102 and the sides of the seawall 200. The movable wing(s) 526, 528, 530, 532 with attached sweep(s) 204, 206, 208, 210 guide lizards, such as iguanas, gradually into the entrance(s) 106, 108 of the assembly 100. The wing(s) 526, 528, 530, 532 are preferably minimal in size, e.g., approximately 50% or less than the height of the entrance diameter, not to present a closed-in threat or wall that can not be easily climbed. However, the wing(s) 526, 528, 530, 532 do not provide an insurmountable barrier or the lizard will, based on testing, turn away or balk away from the entrance(s) 106, 108 of the assembly 100. The wing(s) 526, 528, 530, 532 may also be selectively removable, oriented in various angles, and/or disposed in various configurations to effectuate entry of the lizards into the entrance(s) 106, 108.

The animal trapping device 100 also includes a wire mesh cage assembly 104 coupled to the two opposing sides 506, 508 of the base 102 to define, with the one or more entrance(s) 106, 108, the animal retention zone 520. The cage assembly 104 also has a cage assembly length separating the first and second ends 534, 536 of the cage assembly 100. This cage assembly length may be substantially equal to the length of the base 102 separating its first and second ends 502, 504, e.g., 3-8 feet. Once the base 102, cage assembly 104, and entrance(s) 106, 108 are assembled together, the animal retention zone 520 is enclosed by the upper surface 500 of the base 102, the wire mesh cage assembly 104, and the first and/or second wire mesh entrance(s) 106, 108, wherein the exit apertures 522, 524 of the first and/or second wire mesh entrances 106, 108 provide sole continuous openings into the animal retention zone 520. Said another way, when the assembly 100 is desired for use, the only semi-permanent entrance into the animal retention zone 520 is through the entrance(s) 106, 108. To this end, the wire mesh cage assembly 104 may have selectively removable (partially or completely) sections, e.g., section 400, that are operably configured, e.g., using a hinge, to define openings, e.g., opening 402, into the animal retention zone 520 for removal of the animals trapped therein and/or cleaning of the assembly 100. The sections are also operably configured to securely fasten to the cage assembly 104 to encapsulate or enclose (excluding the exit apertures 522, 524) the animals therein. To secure the sections to the body of the cage assembly 104, an elastic cord 542 and clip hook 544 may be employed in accordance with one embodiment.

In one embodiment, the wire mesh cage assembly 104 may be made of made of welded (galvanized after) hardware cloth wire that is approximately of 15-20 gauge wire and defines a plurality of approximately ½×½ inch openings (as seen best in FIG. 2). The mesh cage assembly 104 may also be provided in a woven construction. This size, shape, and configuration advantageously provides the strength sufficient to resist plastic deformation by lizards, while simultaneously small and resilient to prevent "nosing" and/or escape by the lizards retained therein. To secure the wire mesh cage assembly 104 to the entrance(s) 106, 108 and base 102 in one embodiment, five heavy ¾ inch rings are provided on the 4 vertical corners thereof for the attachment of height-matching hardware cloth wings. A length of threaded rod may be then inserted into the rings on the ½×½ wing rings and the quick and easy attachment ring points on the sides of the trap makes setting up wings quick, secure and easily adapted to the dimensions of the corresponding sea wall 200, animal paths, canals, shelter areas, feeding areas, lagoon bulkheads etc. In other embodiments, the wire mesh cage assembly 104 may be coupled to the entrance(s) 106, 108 and base 102 utilizing adhesive, fasteners, and/or welding. In further embodiments, the assembly 100 may also be casted from a mold or injection molded.

With reference to FIGS. 2-3 and 5-6 and as discussed briefly above, the one or more entrances 106, 108 are also beneficially configured and oriented to attract and retain animals such as lizards in the animal retention zone 520. More specifically, the first wire mesh entrance 106 includes the first end 546 coupled to the first end 534 of the wire mesh cage assembly 104 and defines an enclosed entrance opening 550, a second free end 552 elevated above the upper surface 500 of the base 102 a length 302, and defines the exit aperture 522 thereon. The entrance opening 550 is enclosed in that some portion of the entrance 106 encircles the opening prevents the animal from escape. In one embodiment, the elevated lengths 302, 306 are approximately 6-12 inches in height relative to the upper surface 500 of the base 102. In one embodiment, it is the terminal end of the entrance 106 where the lizard first enters the entrance member 106. The entrance 106 is beneficially of conical shape (i.e., a shape that tapers in width toward the exit aperture 522) that defines an enclosed entrance channel 600 spanning from the enclosed entrance opening 550 to the exit aperture 522 of the first wire mesh entrance 106. In some embodiments, the assembly 100 may be employed with a single entrance 106. In preferred embodiments, however, the use of a second complementary and/or symmetrically disposed second entrance member 108 may be employed that further effectuates the attraction and retentions of more animals such as lizards, namely iguanas. In one embodiment, the enclosed entrance channels of the first and second wire mesh entrances 106, 108, respectively, continually taper in diameter toward the exit apertures 522, 524 spatially coupled thereto.

The second wire mesh entrance 108 similarly includes a first end 548 coupled to the second end 536 of the wire mesh cage assembly 104 and defines an enclosed entrance opening 304, a second free end elevated a length 306 above the upper surface 500 of the base 102. The second entrance 108 also defines an exit aperture 524 and is of a conical shape defining an enclosed entrance channel spanning from the enclosed entrance opening 304 to the exit aperture 524 of the second wire mesh entrance 108. Preferably, the exit apertures 522, 524 of the first and second wire mesh entrances 106, 108 are each disposed within the animal retention zone 520 and beneficially aligned with one another. Said another way, once the lizard approaches the exit aperture of one of the entrances 106, 108 an opposing exit aperture gives the lizard the impression that said approaching exit aperture leads to an exit out of the assembly 100.

The first and/or second conical entrances 106, 108 may be of a wire mesh or lattice configuration having exemplary dimensions and configurations similar to that of the wire cage assembly 104. The exit apertures 522, 524 may be of a circular or other shape that permits entry of the animal into the animal retention zone 520. When two or more entrances 106, 108 are employed, they may be centered or aligned with one another with the wire inside the bottom of the entrance(s) 106, 108 oriented in the longitudinal direction and in the direction of the animal's entry, wherein the top length-wise wire upward is in an axial configuration. In one embodiment, the exit apertures 522, 524 of the first and second wire mesh entrances 106, 108 are concentrically aligned with one another. Said another, as best seen in FIGS. 2-3 the exit apertures 522, 524 of the first and second wire mesh entrances 106, 108 share a common axis, e.g., longitudinal axis 308, or are axially aligned.

In one embodiment, the first and second wire mesh entrances 106, 108 each include or may be described as having a web network of wires defined by a series of longitudinally oriented wires 602a-n (wherein "n" represents any number greater than 1) independently disposed on a posterior side 554 of the mesh entrances 106, 108 and a series of traversely oriented wires 604a-n coupled to the series of longitudinally oriented wires 602a-n and independently disposed on an interior side 556 of each mesh entrance. The web network wire configuration also generates, based on testing, a conducive and inviting feel of the interior of the entrances 106, 108 where the lizard, namely iguanas, enter. Like the wire mesh cage assembly 104, the web network may define a plurality of approximately ½×½ inch web openings, e.g., opening 606, wherein each of the web openings may be further defined by two of the series of longitudinally oriented wires 602a-n and two of the of the series of traversely oriented wires 604a-n. The wires may be of a galvanized steel, ceramic material, polymeric material, e.g., PVC, or other similar material.

The entrance members 106, 108 may have matching wire seams with small inconspicuous fasteners coupling them together in an enclosed configuration. When two entrances 106, 108 are opposing one another, they are designed to allow entry from either direction and may be adjustable in length for the entrance channels and lengths 302, 306 for elevation of the exit apertures 522, 524 to allow only or optimized the assembly 100 for the target species desired to be captured. For example, the diameter of the target animal's head may be the limiting factor in sizing the openings 550, 304 and apertures 522, 524 of the entrance members 106, 108, thus blocking the larger non-target animal's entry into the trap assembly 100.

Once the target animal is in the temperature-moderated portion of the entrance 106, 108 and/or animal retention zone 520, frantic searching for an immediate exit is lessened by the animal, but escape is very difficult once they enter the animal retention zone 520 through the exit aperture of the entrance. To facilitate entry of the animal into the animal retention zone 520, the bottom surface or portion 558 the entrances 106, 108 spans upwardly at an angle α (depicted in FIG. 3) with respect to the upper surface 500 of the base 102 until it reaches the exit aperture. In one embodiment, the enclosed entrance or channel may continuously taper in width or diameter as it spans from the opening to the exit aperture. Said another way, using entrance 106 as an example, the lower terminal portion 558 of the entrance 106 spans from the first end 546 to the second end 552, and is disposed at an approximately 15°-45° sloped orientation with respect to the upper surface 500 of the base 102.

After retained, a rounded top entry or section 400 of the trap assembly 100 defines the opening 402 and may be rotatably and securely coupled to the cage assembly 104 for easy emptying of the trap in high-catch situations and allows the target animals to be funneled into the area where they can be emptied into sized containers or released if they are not the target species. More specifically, the top opening 402 more efficiently enables removal of the retained lizards, whereby a lizard is removed one at a time and the door 400 can be closed after each one.

While the weight of the assembly 100 is typically sufficient to keep the assembly securely fastened to a ground surface, e.g., the seawall 200. The assembly 100 may also employ the use of one or more fasteners, e.g., stakes, and/or a C-clamp fastened to each side 506, 508 of the base 102. The weight of the assembly 100 is heavy enough to resist movement by the animals retained therein, but beneficially light enough to transport by a single user.

To facilitate in transport of the assembly 100, the assembly 100 may employ the use of one or more handles 560, 562 coupled to the upper portion of the cage assembly 104. In one embodiment, holes of approximately 5/16 inches may be provided in appropriate corner positions for the install of rope handles 560, 562 to carry the trap assembly 100 for positioning. Removal of the rope handles is recommended after the trap is in place. When the assembly is not in use, a user may close entry into the animal retention zone 520 by utilizing two foam balls (sized to be larger than the exit apertures 522, 524) selectively and removably couplable together with a rod, thereby plugging the exit apertures 522, 524 of the entrances 106, 108. As such, when desired for use, the trap assembly 100 can be left in place to catch the target species and the foam balls may be removed.

With reference to FIGS. 7-13 and FIGS. 14-16, other versions of the assemblies 700, 1400, respectively, are shown. In general, these embodiments enable a user to selectively insert and remove one or more base(s) depending on the ambient environmental conditions where the assemblies 700, 1400 are installed. As will be appreciated by those of skill the art, the assemblies 700, 1400 depicted in FIGS. 7-16 include many of the same components describe above in reference to FIGS. 1-6. Specifically, some ambient environments where the assemblies 700, 1400 are placed for harvesting iguanas have significant temperature differentials based on the time of year or season. Having a selectively removable base 800, 900, 1000, 1100, 1200, 1300, 1600 (as best seen in FIGS. 8-13 and FIG. 16) and/or the ability to provide liquid from a liquid source to the base provides a user a selection of bases to generate an interior condition of the assemblies that better lure the iguanas into the trap assemblies 700, 1400. Embodiments of the assemblies 700, 1400 also enable quick, effective, and safe coupling of the assemblies 700, 1400 to a ground surface, seawall, etc.

The animal trapping device 700 can be seen having a base 800 having a first end 802, a second end 804 opposing the first end 802, two opposing sides 806, 808, a lower surface 902, an upper surface 810 opposing the lower surface of the base, and a base length 812 separating the first and second ends 802, 804 of the base 800. In one embodiment, the lower surface 902 for each base is substantially planar, i.e., relatively flat and without raised surfaces that would otherwise make the base substantially not level (+/−10°) to enable a flush coupling configuration with the ground surface. The width 720 of wire mesh cage assembly 702 may, in some embodiments, uniformly (or otherwise) span at least 80% of the wire mesh length 712.

Figures 8, 9:
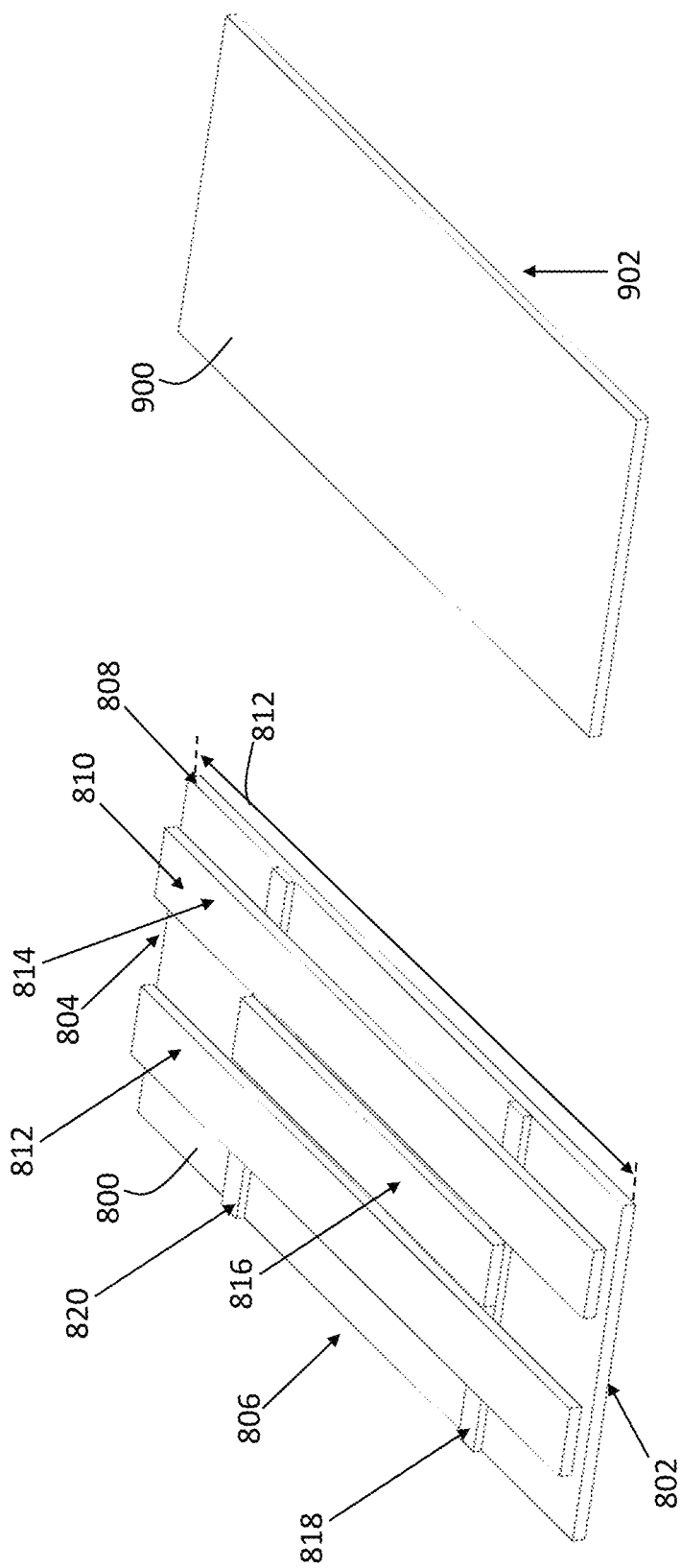

With reference to FIG. 9 and FIG. 11, the upper surface 810 of the bases, namely the bases 900, 1100, may be substantially planar. In one embodiment, the lower surface 902 of the base 802 is substantially planar spanning from the first and second ends 802, 804 of the base 802. For example, the base 900 provides a substantially surface providing an iguana a basking area in grassy areas where iguanas are feeding and want to rest and bask where there is no grass. The base 1100 provides a substantially surface but includes one or more cutouts or recesses strategically placed and shaped and sized to receive slices of fruit, enticing iguanas to enter the retention zone 726 and the mesh entrances. In a preferred embodiment, the base 1100 is used at ambient environmental temperatures above 85° F. and when the iguanas are actively feeding.

Referring back to FIG. 7, the wire mesh cage assembly 702 has a first end 704 with a perimeter edge 706, a second end 708 with a perimeter edge 710 and opposing the first end 704 of the wire mesh cage assembly 702, a wire mesh length 712 separating the first and second ends 704, 708, and two opposing side edges 714, 716 spanning the wire mesh length 712. The two opposing side edges 714 define a base opening 718 and a width 720. Advantageously, the base 800 is selectively, freely, and removably disposed within the base opening 718. Said another way, the bases 800, 900, 1000, 1100, 1200, 1300, 1600 are structurally unattached to the case assembly 702 without any fasteners and/or can otherwise be removed without detaching the base from the cage assembly 702. For example, the base may be removed by lifting the cage assembly 702 and sliding the base from underneath the cage assembly 702.

As discussed above and as shown in FIGS. 5-6, the first and second wire mesh entrances include a first end coupled around and beginning from the perimeter edges 706, 710 of the first and second ends 704, 708, respectively. Each of the mesh entrances define an enclosed entrance opening around the perimeter edge of the end to which they are attached and include a second free end elevated above the upper surface 810 of the base 800 and defining an exit aperture. The first and second wire mesh entrances may be of a wire mesh configuration spanning from the first end of the first wire mesh entrance to the second free end of the first wire mesh entrance, and define an enclosed entrance channel spanning from the enclosed entrance opening to the exit aperture. The first and second wire mesh entrances, the wire mesh cage assembly 702, and the upper surface 810 of the base 800 can be seen defining an animal retention zone 726. The exit apertures of the first and second wire mesh entrances face one another and are at least partially aligned with one another without obstruction disposed between the exit apertures and within the animal retention zone. In another embodiment, the first and second wire mesh entrances are of a conical shape and the exit apertures of the first and second wire mesh entrances are concentrically aligned with one another.

With reference to FIGS. 8-10, this base 800, 1000 also fits within the base opening 718. The topography of the base 1000 also beneficially provides one or more raised basking surfaces 812, 814, 816 on planks offset with one or more spacing plank(s) 818, 820, thereby providing cooling under the raised surfaces 812, 814, 816. The topography also generates a cooling effect with air flow without, necessarily, the evaporative cooling effect described herein. Similarly, with reference to FIG. 10, the base 1000 may also be utilized when the trap assembly 700 can be anchored to the ground surface or other structure by large nails or other fastener(s) 1002, 1004 and/or a fender washer or other spacing member coupled to the base 1000.

Figures 12, 13:
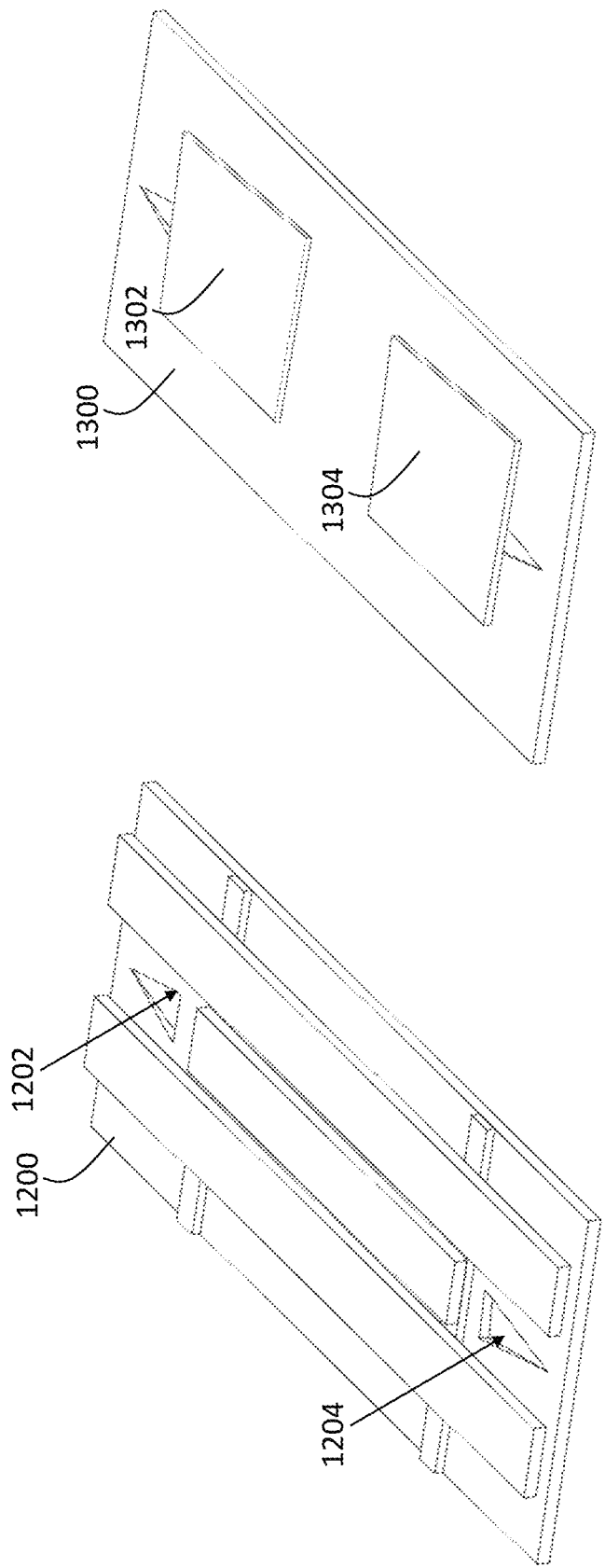
Figure 16:
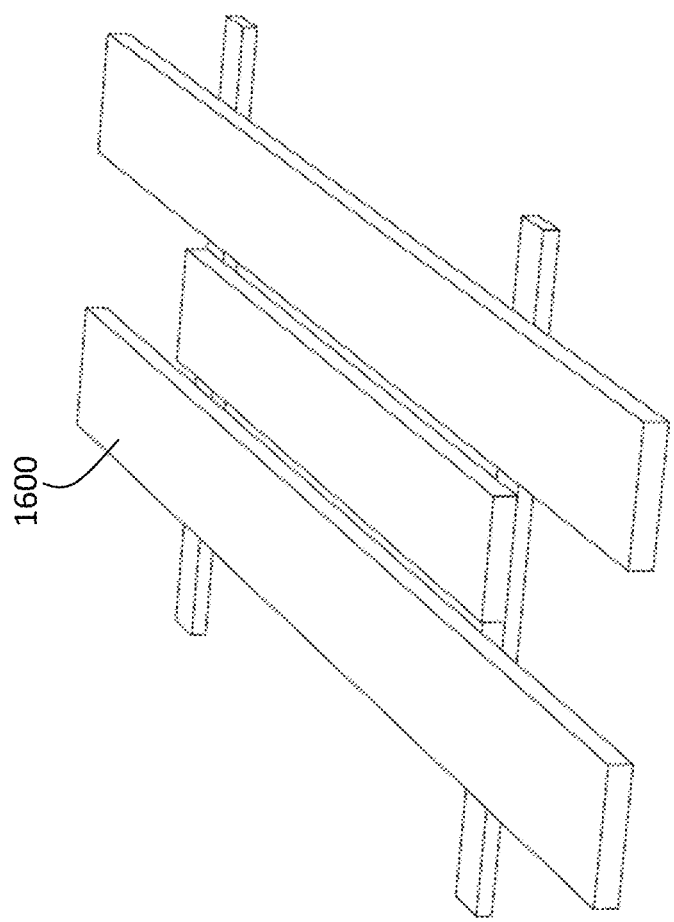
FIG. 16 is a perspective view of a base configured for selective placement within a base opening defined by the animal trapping devices depicted in FIG. 7 and FIG. 15.

With reference to FIGS. 12-13, other embodiments of the base 1200, 1300 can be seen. Specifically, the base 1200 includes the aforementioned air-cooling effect generates from the raised surfaces but may also beneficially include reservoir(s) 1202, 1204 to generate the evaporative cooling effect described herein. This base 1200 may be beneficially utilized with 90° F. and above ambient environmental temperatures. The base 1300 also, like the others, fits within the base opening 718 and is designed for use in colder environments (e.g., 69° F.-80° F.) to generate a temperature differential within the retention zone and/or underneath the mesh entrances. It does this through utilizing one or more heating elements or pads 1302, 1304. As such, the heating elements/pads 1302, 1304 may be coupled to a power source (e.g., 12V DC or 110V AC) and may be electrically coupled to a solar cell/battery. Each of the bases may be made of polymeric material, including wood, ceramic, or another material and may be placed in many different areas around lakes, swimming pools, grassy areas where there is no structure to make them congregate, like iguanas typically do when there is a seawall. The bases can be placed in elevated areas where the iguanas will visit them as needed. The removable nature of the bases also allows them to be utilized themselves, without the cage assembly 702, thereby placing the cage assembly 702 over the base when the user desires to retain the iguanas. Said another way, the iguanas will have no fear of the cage assembly 702, but rather just an urge to bask on the base that has been used every day. Therefore, the plurality of bases 800, 900, 1000, 1100, 1200, 1300, 1600 each may have a different surface topography and may each be selectively, freely, and removably disposed within the base opening 718 for effective and efficient trapping of iguanas.

Referring back to FIG. 7, a first barrier member 722 is coupled to the wire mesh cage assembly 702, is disposed at the first end 704 of the wire mesh cage assembly 702, and spans to-and-from (but necessarily continuously) and coupled to the two opposing side edges 714, 716 of the wire mesh cage assembly 702. A second barrier member 724 may also be coupled to the wire mesh cage assembly 702, be disposed at the second end 708 of the wire mesh cage assembly 702, and spans to-and-from and coupled to the two opposing side edges 714, 716 of the wire mesh cage assembly 702. The first and second barrier members 722, 724 may define the base opening 718 and may be substantially equal to the base length 812, e.g., 4-6 feet, to allow for a snug fit. In some embodiments, the fit may be sufficient to compressively retain the base with respect to side reinforcement members 736, 738 coupled to the sides 714, 716 of the cage assembly 702, respectively. The first and second barrier members 722, 724 may also be a thickness (e.g., 0.5-2 inches) operably configured to prevent the base 802 to longitudinally (i.e., in a direction from end 704 to end 708) translate a pre-set length (e.g., 4-6 feet) within the base opening 718. The assembly 700 may also include one or more ramp(s) 740, 742 directly coupled to the first and second barrier members 722, 724, wherein the ramps may extend upwardly in height until the first and second wire mesh entrances, respectively.

To effectively retain the cage assembly 700 to the seawall or other similar structure, one or more vice clamping assemblies 1402a-n may be utilized. The vice clamping assemblies 1402a-n may span the width 720 defined by two opposing side edges 714 and have two opposing clamp members 1406, 1408 operably configured to expand and compress a clamping width 1410 separating the two opposing clamp members 1406, 1408. At least a portion of the two opposing clamp members 1406, 1408 may protrude passed the two opposing side edges 714, respectively.

To effectively generate an evaporative cooling effect in the cage assembly 700 as described above, a reservoir may be formed on the base and is operably configured to house and retain a liquid, e.g., water, thereon, wherein the reservoir may be interposed between at least one of the first and second wire mesh entrances and/or the base. Additionally, a liquid feeding assembly 728 with a container 730 housing a liquid therein and with a liquid feed conduit 732 are utilized, wherein the liquid feed conduit has an end opening 734 disposed proximal (i.e., over, within, or a sufficient distance to provide liquid to) to the reservoir and in liquid communication with the container 730 housing the liquid. The liquid feeding assembly 728 is operably configured to supply liquid from the container 730 to the reservoir, e.g., through gravity and/or a pump.

Although the specification has described a specific order or method of use, the order of executing the steps may be changed relative to the order described in certain embodiments. Also, two or more steps described above as occurring in succession may be executed concurrently or with partial concurrence in some embodiments. Certain steps may also be omitted in for the sake of brevity. In some embodiments, some or all of the process steps can be combined into a single process.

An animal trapping assembly has been disclosed that effectively and efficiently traps animals, such as iguanas. The trap assembly 100 is designed to be positioned on seawalls 200, narrowed pathways and/or basking areas that offer a mixture of sun and shade. Specifically, iguanas and other lizards seek temperature and sun or cooler shade, and may follow the shade throughout the day. The basin(s) and/or reservoir(s) provide the cooler environment emulating shade, while the upper surface 500 of the base 102 enables the lizards to bask in the sun. The matching entrances 106, 108 further facilitate in trapping the lizards from either direction and lure the lizards into the animal retention zone 520.

What is claimed is:
1. An animal trapping device comprising:
   a base having a first end, a second end opposing the first end, two opposing sides, a lower surface, an upper surface opposing the lower surface of the base and defining a topography thereon with a plurality of planks longitudinally and transversely offset from one another and having a plurality of raised basking surfaces spaced apart from one another and offset a height from portions of the upper surface of the base with one or more spacing planks disposed underneath the plurality of longitudinally and transversely offset planks and on top of the upper surface of the base to generate a cooling effect, and a base length separating the first and second ends of the base;

a wire mesh cage assembly having a first end with a perimeter edge, a second end with a perimeter edge and opposing the first end of the wire mesh cage assembly, a wire mesh length separating the first and second ends of the wire mesh cage assembly, and two opposing side edges spanning the wire mesh length, the two opposing side edges defining a base opening and a width, the base selectively, freely, and removably disposed within the base opening;

a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the first wire mesh entrance to the second free end of the first wire mesh entrance, and defining an enclosed entrance channel spanning from the enclosed entrance opening to the exit aperture of the first wire mesh entrance; and a second wire mesh entrance with a first end coupled around and beginning from the perimeter edge of the second end of the wire mesh cage assembly and defining an enclosed entrance opening around the perimeter edge of the second end of the wire mesh cage assembly, a second free end elevated above the upper surface of the base and defining an exit aperture, of a wire mesh configuration spanning from the first end of the second wire mesh entrance to the second free end of the second wire mesh entrance, and defining an enclosed entrance channel spanning from the enclosed entrance opening to the exit aperture of the second wire mesh entrance, the first and second wire mesh entrances, the wire mesh cage assembly, and the upper surface of the base defining an animal retention zone with the topography of the base disposed underneath both the first and second wire mesh entrances and the exit apertures of the first and second wire mesh entrances facing one another and at least partially aligned with one another without obstruction disposed between the exit apertures and within the animal retention zone.

2. The animal trapping device according to claim 1, further comprising:
a reservoir defined by the upper surface of the base and operably configured to retain a liquid, wherein the reservoir is interposed between at least one of the first and second wire mesh entrances and the base, thereby configured to cause an evaporative cooling effect within the animal retention zone.

3. An animal trapping device comprising:
a wire mesh cage assembly having a first end with a perimeter edge, a second end with a perimeter edge and opposing the first end of the wire mesh cage assembly, a wire mesh length separating the first and second ends, and two opposing side edges spanning the wire mesh length, the two opposing side edges defining a base opening and a width;

a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the base opening and defining an exit aperture, of a wire mesh configuration spanning from the first end of the first wire mesh entrance to the second free end of the first wire mesh entrance, and defining an enclosed entrance channel spanning from the enclosed entrance opening to the exit aperture of the first wire mesh entrance;

a second wire mesh entrance with a first end coupled around and beginning from the perimeter edge of the second end of the wire mesh cage assembly and defining an enclosed entrance opening around the perimeter edge of the second end of the wire mesh cage assembly, a second free end elevated above the base opening and defining an exit aperture, of a wire mesh configuration spanning from the first end of the second wire mesh entrance to the second free end of the second wire mesh entrance, and defining an enclosed entrance channel spanning from the enclosed entrance opening to the exit aperture of the second wire mesh entrance, the first and second wire mesh entrances and the wire mesh cage assembly defining an animal retention zone and the exit apertures of the first and second wire mesh entrances facing one another and at least partially aligned with one another without obstruction disposed between the exit apertures and within the animal retention zone; and a vice clamping assembly spanning the width defined by the two opposing side edges of the wire mesh cage assembly and having two opposing clamp members operably configured to expand and compress a clamping width separating the two opposing clamp members, at least a portion of the two opposing clamp members each protruding past the two opposing side edges, respectively.

4. An animal trapping device comprising:
a base having a first end, a second end opposing the first end, two opposing sides, a lower surface, an upper surface opposing the lower surface of the base, a reservoir, defined by the upper surface of the base, operably configured to retain a liquid, and a base length separating the first and second ends of the base;

a wire mesh cage assembly having a first end with a perimeter edge, a second end with a perimeter edge and opposing the first end of the wire mesh cage assembly, a wire mesh length separating the first and second ends of the wire mesh cage assembly, and two opposing side edges spanning the wire mesh length, the two opposing side edges defining a base opening and a width, the base selectively, freely, and removably disposed within the base opening;

a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the first wire mesh entrance to the second free end of the first wire mesh entrance, and defining an enclosed entrance channel spanning from the enclosed entrance opening to the exit aperture of the first wire mesh entrance;

a second wire mesh entrance with a first end coupled around and beginning from the perimeter edge of the second end of the wire mesh cage assembly and defining an enclosed entrance opening around the perimeter edge of the second end of the wire mesh cage assembly, a second free end elevated above the upper surface of the base and defining an exit aperture, of a wire mesh configuration spanning from the first end of the second wire mesh entrance to the second free end of the second wire mesh entrance, and defining an enclosed entrance channel spanning from the enclosed entrance opening to the exit aperture of the second wire mesh entrance, the first and second wire mesh entrances, the wire mesh cage assembly, and the upper surface of the base defining an animal retention zone and the exit apertures of the first and second wire mesh entrances facing one another and at least partially aligned with one another without obstruction disposed between the exit apertures and within the animal retention zone; and a liquid feeding assembly with a container housing a liquid therein and with a liquid feed conduit having an end opening disposed proximal to the reservoir and in liquid communication with the container housing the liquid, the liquid feeding assembly operably configured to supply liquid from the container to the reservoir.

5. The animal trapping device according to claim 4, further comprising:

a first barrier member coupled to the wire mesh cage assembly, disposed at the first end of the wire mesh cage assembly, and spanning to-and-from and coupled to the two opposing side edges of the wire mesh cage assembly; and a second barrier member coupled to the wire mesh cage assembly, disposed at the second end of the wire mesh cage assembly, and spanning to-and-from and coupled to the two opposing side edges of the wire mesh cage assembly, the first and second barrier members defining the base opening which is substantially equal to the base length.

6. The animal trapping device according to claim 5, wherein each of the first and second barrier members further comprise:

a ramp directly coupled thereto and extending upwardly in height until the first and second wire mesh entrances, respectively.

7. The animal trapping device according to claim 4, further comprising:

a first barrier member coupled to the wire mesh cage assembly, disposed at the first end of the wire mesh cage assembly, and spanning to-and-from and coupled to the two opposing side edges of the wire mesh cage assembly; and a second barrier member coupled to the wire mesh cage assembly, disposed at the second end of the wire mesh cage assembly, and spanning to-and-from and coupled to the two opposing side edges of the wire mesh cage assembly, the first and second barrier members defining the base opening and each being of a thickness operably configured to prevent the base to longitudinally translating a pre-set length within the base opening.

8. The animal trapping device according to claim 4, wherein:

the wire mesh cage assembly is of approximately 15-20 gauge wire and defining a plurality of approximately ½×½ inch openings.

9. The animal trapping device according to claim 4, wherein:

the lower surface of the base is substantially planar spanning from the first end of the base to second end of the base.

10. The animal trapping device according to claim 4, wherein:

the width of wire mesh cage assembly uniformly spans at least 80% of the wire mesh length.

11. The animal trapping device according to claim 4, wherein:

the first and second wire mesh entrances are of a conical shape.

12. The animal trapping device according to claim 4, wherein:

the exit apertures of the first and second wire mesh entrances are concentrically aligned with one another.

13. The animal trapping device according to claim 4, further comprising:

a vice clamping assembly spanning the width defined by the two opposing side edges of the wire mesh cage assembly and having two opposing clamp members operably configured to expand and compress a clamping width separating the two opposing clamp members, at least a portion of the two opposing clamp members each protruding past the two opposing side edges, respectively.

14. The animal trapping device according to claim 4, wherein:

the enclosed entrance channels of the first and second wire mesh entrances, respectively, continually taper in diameter toward the exit aperture spatially coupled thereto.

15. An animal trapping device comprising:

a base having a first end, a second end opposing the first end, two opposing sides, a lower surface, an upper surface opposing the lower surface of the base, a base length separating the first and second ends of the base, and defining a reservoir operably configured to house and retain a liquid thereon;

a wire mesh cage assembly having a first end with a perimeter edge, a second end with a perimeter edge and opposing the first end of the wire mesh cage assembly, a wire mesh length separating the first and second ends of the wire mesh cage assembly, and two opposing side edges spanning the wire mesh length;

a first wire mesh entrance with a first end coupled around and beginning from the perimeter edge of the first end of the wire mesh cage assembly and defining an enclosed entrance opening around the perimeter edge of the first end of the wire mesh cage assembly, a second free end elevated above the upper surface of the base and defining an exit aperture, of a wire mesh configuration spanning from the first end of the first wire mesh entrance to the second free end of the first wire mesh entrance, and defining an enclosed entrance channel spanning from the enclosed entrance opening to the exit aperture of the first wire mesh entrance;

a second wire mesh entrance with a first end coupled around and beginning from the perimeter edge of the second end of the wire mesh cage assembly and defining an enclosed entrance opening around the perimeter edge of the second end of the wire mesh cage assembly, a second free end elevated above the upper surface of the base and defining an exit aperture, of a wire mesh configuration spanning from the first end of the second wire mesh entrance to the second free end of the second wire mesh entrance, and defining an enclosed entrance channel spanning from the enclosed entrance opening to the exit aperture of the second wire mesh entrance, the first and second wire mesh entrances, the wire mesh cage assembly, and the upper surface of the base defining an animal retention zone and the exit apertures of the first and second wire mesh entrances facing one another and at least partially aligned with one another without obstruction disposed between the exit apertures and within the animal retention zone, and the reservoir interposed at a position between the first and second wire mesh entrances; and a liquid feeding assembly with a container operably configured to house a liquid therein and with a liquid feed conduit having an end opening disposed proximal to the reservoir disposed at least partially underneath a bottom portion of at least one of the first and second wire mesh entrances that spans upwardly from the first end of the at least one of the first and second wire mesh entrances, thereby configured to cause an evaporative cooling effect within the enclosed entrance channel therein, the liquid feed conduit in liquid communication with the container housing the liquid, the liquid feeding assembly operably configured to supply liquid from the container to the reservoir.

16. The animal trapping device according to claim 15, wherein:

the two opposing side edges of the wire mesh cage assembly defining a base opening and a width, the base selectively, freely, and removably disposed within the base opening.

\* \* \* \* \*